United States Patent
Liu et al.

(10) Patent No.: US 11,526,554 B2
(45) Date of Patent: Dec. 13, 2022

(54) PREVENTING THE DISTRIBUTION OF FORBIDDEN NETWORK CONTENT USING AUTOMATIC VARIANT DETECTION

(71) Applicant: Google LLC, Mountain View, CA (US)

(72) Inventors: Yintao Liu, Union City, CA (US); Vaibhav Vaish, San Jose, CA (US); Rachel Xu, Sunnyvale, CA (US); Zhaofu Chen, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/517,198

(22) PCT Filed: Dec. 9, 2016

(86) PCT No.: PCT/US2016/065901
§ 371 (c)(1),
(2) Date: Apr. 6, 2017

(87) PCT Pub. No.: WO2018/106261
PCT Pub. Date: Jun. 14, 2018

(65) Prior Publication Data
US 2019/0286663 A1    Sep. 19, 2019

(51) Int. Cl.
*G06F 16/9035* (2019.01)
*G06F 16/36* (2019.01)
(Continued)

(52) U.S. Cl.
CPC ........ *G06F 16/9035* (2019.01); *G06F 16/328* (2019.01); *G06F 16/3349* (2019.01);
(Continued)

(58) Field of Classification Search
CPC .. G06F 16/9035; G06F 16/374; G06F 16/328; G06F 16/3349; G06F 16/355;
(Continued)

(56) References Cited

U.S. PATENT DOCUMENTS 7,321,892 B2 *  1/2008  Vadon .................. G06F 17/273
                                                         707/767
7,716,229 B1 *  5/2010  Srivastava ............ G06Q 30/02
                                                         707/737
(Continued)

FOREIGN PATENT DOCUMENTS

CN        101071422       11/2004
CN         1682216        10/2005
(Continued)

OTHER PUBLICATIONS

Office Action in Chinese Appln. No. 201680003648.1, dated Sep. 14, 2021, 14 pages (with English translation).
(Continued)

*Primary Examiner* — William B Partridge
*Assistant Examiner* — Erich Alexander Fischer
(74) *Attorney, Agent, or Firm* — Fish & Richardson P.C.

(57) ABSTRACT

The subject matter of this specification generally relates to preventing the distribution of forbidden network content. In one aspect, a system includes a front-end server that receives content for distribution over a data communication network. The back-end server identifies, in the query log, a set of received queries for which a given forbidden term was used to identify a search result in response to the received query even though the given forbidden term was not included in queries included in the set of received queries. The back-end server classifies, as variants of the given forbidden term, a term from one or more queries in the set of received queries that caused a search engine to use the given forbidden term to identify one or more search results in response to the one or more queries and prevents distribution of content that includes a variant.

20 Claims, 4 Drawing Sheets

(51) Int. Cl.
*G06F 16/31* (2019.01)
*G06F 16/33* (2019.01)
*G06F 16/35* (2019.01)
*G06F 16/9535* (2019.01)

(52) U.S. Cl.
CPC .......... *G06F 16/355* (2019.01); *G06F 16/374* (2019.01); *G06F 16/9535* (2019.01)

(58) Field of Classification Search
CPC ............... G06F 16/9535; G06F 16/903; G06F 16/9536; G06F 16/9538
See application file for complete search history.

(56) References Cited

U.S. PATENT DOCUMENTS

| | | | |
|---|---|---|---|
| 7,840,577 B2 | 11/2010 | Ortega et al. | |
| 8,484,192 B1* | 7/2013 | Sahami | G06F 16/9535 707/765 |
| 2004/0054661 A1 | 3/2004 | Cheung et al. | |
| 2005/0060312 A1* | 3/2005 | Curtiss | G06F 16/9535 |
| 2007/0038615 A1* | 2/2007 | Vadon | G06F 40/232 |
| 2010/0082657 A1 | 4/2010 | Paparizos et al. | |
| 2010/0306191 A1 | 12/2010 | LeBeau et al. | |
| 2010/0306238 A1* | 12/2010 | Balakrishnan | G06F 16/328 707/769 |
| 2011/0295897 A1 | 12/2011 | Gao et al. | |
| 2013/0204864 A1 | 8/2013 | Matsuo | |
| 2017/0126686 A1* | 5/2017 | Totov | H04L 63/105 |

FOREIGN PATENT DOCUMENTS

| | | |
|---|---|---|
| CN | 101288046 | 10/2008 |
| CN | 102073725 | 5/2011 |
| CN | 104504091 | 4/2015 |
| CN | 104866770 | 8/2015 |
| CN | 105989093 | 10/2016 |
| EP | 2747023 | 6/2014 |
| JP | 2005-539311 | 12/2005 |
| JP | 2008-537225 | 9/2008 |
| JP | 2010-55307 | 3/2010 |
| JP | 2013-152555 | 8/2013 |
| KR | 10-2012-0040160 A | 4/2012 |
| WO | 2006/110684 | 10/2006 |
| WO | WO 2006110684 | 10/2006 |

OTHER PUBLICATIONS

CN Office Action in Chinese Application No. 201680003648.1, dated Mar. 3, 2021, 16 pages (with English translation).
KR Notice of Allowance issued in Korean Application No. 10-2017-7015884 , dated Jan. 29, 2019, 3 pages (with English translation).
IN Office Action in Indian Application No. 201827037060, dated Feb. 10, 2021, 6 pages (with English translation).
Zittrain et al., "Internet Filtering in China" Harvard, 2005, 59 pages.
Office Action in Chinese Appln. No. 201680003648.1, dated Dec. 10, 2021, 20 pages (with English translation).
'www.google.com' [online] "Inside Search: Knowledge," Last update: unknown [retrieved on Jul. 27, 2017] Retrieved from Internet: URL< https://www.google.com/intl/es419/insidesearch/features/search/knowledge.html> 3 pages.
'www.wikipedia.org' [online] "Query expansion," Last updated on: Feb. 13, 2017, [retrieved on Jul. 27, 2017] Retrieved from Internet: URL< https://en.wikipedia.org/wiki/Query_expansion> 3 pages.
'www.wordnet.princeton.edu' [online] "WordNet: a lexical database for English," Last update Mar. 17, 2015, [retrieved on Jul. 27, 2017] Retrieved from Internet: URL< http://wordnet.princeton.edu/> 3 pages.
International Search Report and Written Opinion in International Application No. PCT/US2016/065901, dated Feb. 15, 2017, 12 pages.

* cited by examiner

PREVENTING THE DISTRIBUTION OF FORBIDDEN NETWORK CONTENT USING AUTOMATIC VARIANT DETECTION

CROSS-REFERENCE TO RELATED APPLICATIONS

This application is a National Stage application under 35 U.S.C. § 371 of International Application No. PCT/US2016/065901, filed Dec. 9, 2016. The disclosure of the prior application is incorporated by reference in its entirety.

BACKGROUND

The Internet facilitates the exchange of information and transactions between users across the globe. This exchange of information enables data providers to provide data to a variety of users. The data can be provided in various ways, including publishing the information on electronic documents (e.g., web pages) and within applications (e.g., mobile apps). Some Internet content providers and government entities prohibit the publication of certain content and/or certain types of content. For example, some government entities may prohibit the publication of content related to the distribution of illegal drugs on Internet web sites.

SUMMARY

This specification describes systems, methods, devices, and other techniques for identifying variants of forbidden terms and preventing the distribution of content that includes the variants.

In general, one innovative aspect of the subject matter described in this specification can be implemented in a system that includes one or more data storage devices that store (i) data identifying a set of forbidden terms and (ii) a query log that includes received queries. The system can include one or more front-end servers that receive content for distribution over a data communication network and one or more back-end servers that communicate with the data storage device and the one or more front-end servers. The one or more back-end servers can identify, in the query log, a set of received queries for which a given forbidden term was used to identify a search result in response to the received query even though the given forbidden term was not included in queries included in the set of received queries. The one or more back-end servers can classify, as variants of the given forbidden term, a term from one or more queries in the set of received queries that caused a search engine to use the given forbidden term to identify one or more search results in response to the one or more queries. The one or more back-end servers can prevent distribution of content that includes a variant of the given forbidden term by the one or more front-end servers. Other implementations of this aspect include corresponding apparatus, methods, and computer programs, configured to perform the actions of the methods, encoded on computer storage devices.

These and other implementations can optionally include one or more of the following features. In some aspects, identifying the set of received queries for which a given term was used to identify a search result in response to the received query even though the given forbidden term was not included in queries included in the set of received queries can include identifying a given received query that was expanded by the search engine to include the forbidden term. In some aspects, the one or more back-end servers identify, using a semantic network of terms, a term semantically linked to the forbidden term as a variant of the forbidden term.

In some aspects, classifying, as variants of the forbidden term a term from one or more queries in the set of received queries includes identifying a set of candidate variants of the forbidden term, determining a score for each candidate variant, and selecting, as the variants of the forbidden term, one or more candidate variants based on the score for each candidate variant. The set of candidate variants can include a first candidate variant for which a spelling of the first candidate variant was corrected to the forbidden term and a second candidate variant that was added to a received query that included the forbidden term. The score for the first candidate variant can be based on an edit distance between the first candidate variant and the forbidden term. The score for the second candidate variant can be based on inverse document frequency score for the second candidate variant.

In some aspects, identifying, in the query log, a set of received queries for which a given forbidden term was used to identify a search result in response to the received query even though the given forbidden term was not included in queries included in the set of received queries can include using a map procedure to identify, from the query log, candidate variants of each forbidden term. In some aspects, classifying, as variants of the forbidden term, a term from one or more queries in the set of received queries that caused a search engine to use the forbidden term to identify one or more search results in response to the one or more queries can include using a reduce procedure for each forbidden term to select, from the candidate variants for the forbidden term, one or more variants of the forbidden term. Each reduce procedure can be performed on a separate back-end server.

Particular embodiments of the subject matter described in this specification can be implemented so as to realize one or more of the following advantages. By identifying variants of forbidden terms, content that includes the variants can be blocked from distribution over a network (e.g., the Internet) automatically and prior to distribution, thereby improving the content filtering capabilities of the system. Using query logs to identify variants of a forbidden term allows the system to identify variants that users are more likely to include in content, but would not have otherwise been identified. By identifying a set of variants that are more likely to be used, the system can reduce the number of variants maintained for each forbidden term which allows the system to more quickly and more efficiently determine whether content includes a forbidden term. For example, comparing terms included in content to a smaller set of forbidden terms (and variants thereof) enables the system to use fewer computing resources (e.g., fewer CPU cycles, less memory, fewer network components and bandwidth, etc.) to determine whether the content includes a forbidden term. This also allows the system to more quickly process large amounts of content to determine whether any of the content includes a forbidden term or a variant of a forbidden term. Using an automated variant detection, ranking, and/or selection techniques allows for the detection of variants at scale, instead of relying on human trial and error.

Various features and advantages of the foregoing subject matter is described below with respect to the figures. Additional features and advantages are apparent from the subject matter described herein and the claims.

DETAILED DESCRIPTION

Figure 1:
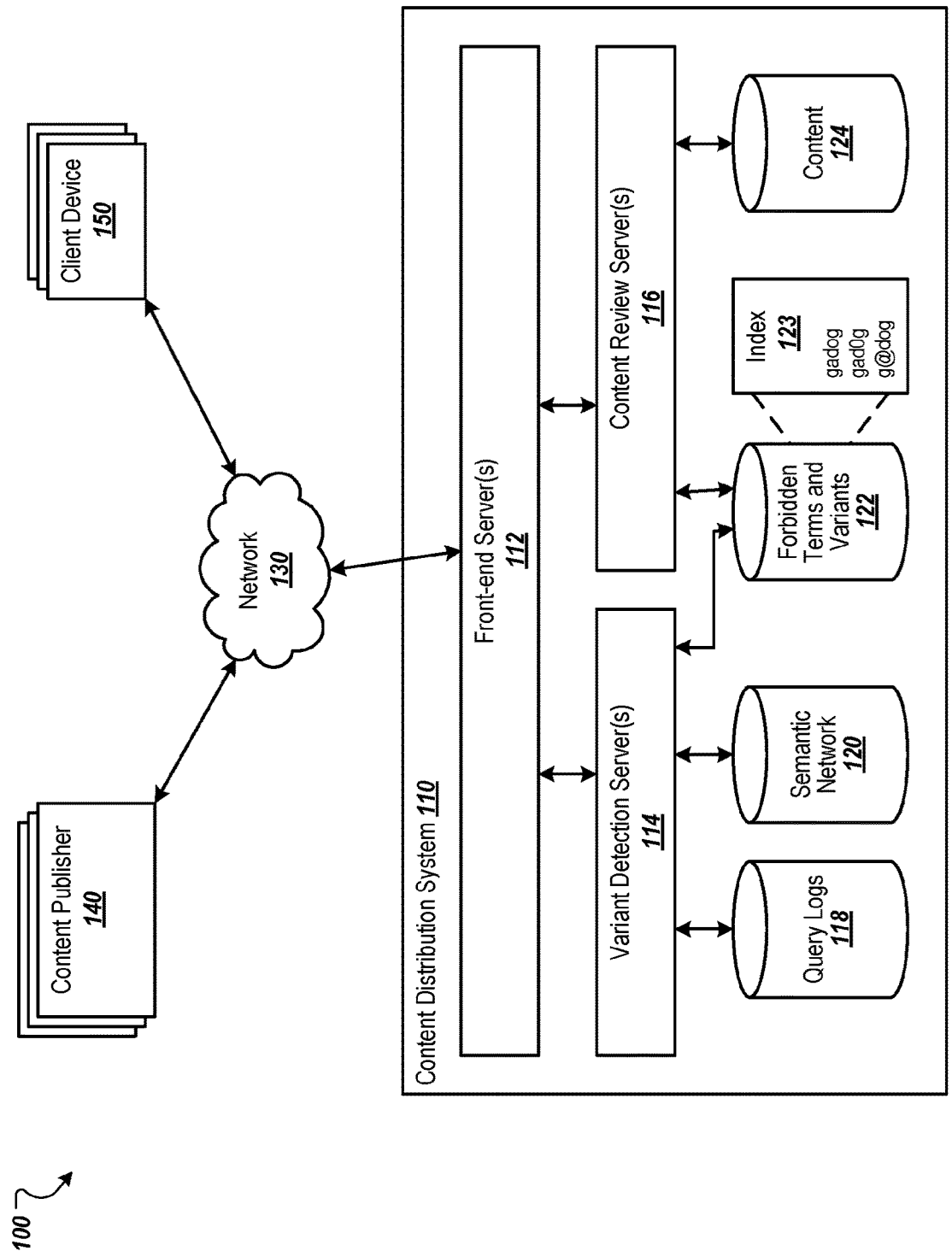
FIG. 1 is an example environment in which a content distribution system identifies variants of forbidden terms and prevents the distribution of content that includes the variants.

In general, systems and techniques described herein allow for the identification and selection of variants of forbidden terms. Content that includes a forbidden term or a variant of a forbidden term can be blocked from distribution over a network, e.g., over the Internet. For example, Internet content providers and government entities may prohibit the publication of content that includes certain forbidden terms. Users may attempt to get around these prohibitions by using variants of the forbidden terms. For example, assume that the term "gadog" is the name of an illegal drug. A user may substitute the term "gad0g" for the term "gadog" in content related to the distribution of gadog to avoid detection by content review systems. The systems and techniques described herein can identify the variant "gad0g" and prevent the distribution of content that includes this variant.

Each forbidden term can have thousands or millions of potential variants. For example, the term "gadog" can have thousands of variants by changing, for each variant, one letter to a different letter, number, or character. Identifying each possible variant of each forbidden term would require a substantial amount of data processing, resulting in the consumption of many processors and/or CPU cycles of each processor. Maintaining thousands of variants of each forbidden term would require more data storage devices (e.g., hard drives, flash memory, etc.) than an index of the higher ranked or more likely to be used variants, resulting in less storage space for other data and/or slower data access times. In addition, comparing terms included in content to thousands or millions or variants of the forbidden terms to determine whether to allow the distribution of the content requires more computing resources (e.g., more processors or CPU cycles) than comparing the text to an index of the higher ranked or more likely to be used variants. Accordingly, there is a need for ensuring that all potential variants of forbidden terms prevented from distribution are identified, and that such variants also prevented from distribution over a network in an efficient manner using less processing and network resources.

The present disclosure provides systems and techniques described for identifying variants of forbidden terms using one or more of several data sources, so as to also ensure that new or previously unidentified variants of forbidden terms are considered. Aspects of the embodiments described herein address the above mentioned drawbacks by providing methods and systems for identifying and preventing variants of forbidden terms from distribution over a communication network in an efficient, accurate, reliable and scalable manner. For example, a query log can be used to identify, as variants of a forbidden term, terms of queries for which a search engine used the forbidden term to identify search results for the query even though the query did not include the forbidden term. In a particular example, the search engine may expand a query to include one or more terms that are related to terms included in the query term, such as synonyms of the terms included in the query. If a particular term causes the search engine to add a forbidden term to the query, the particular term may be classified as a variant of the forbidden term. Similarly, if a query includes a forbidden term and that query is expanded to include another term based on the forbidden term, the other term may be classified as a variant of the forbidden term.

Another example variant may be misspelling of the forbidden term that was received in a query. In this example, the search engine may correct the spelling of the term to the forbidden term. Terms that the search engine spell corrected to the forbidden term may be identified as variants of the forbidden term.

Another data source that may be used to identify variants of forbidden terms is a semantic network. A semantic network is a network that represents semantic relationships between terms. The system can use the semantic network to identify terms that are semantically related to each forbidden term.

The system can select variants of a forbidden term from a set of candidate variants. For example, the system can rank the set of candidate variants based on one or more criteria and select variants of the forbidden term based on the ranking. In some implementations, the system may rank different types of variants separately and select variants for the forbidden term from each of the separate rankings.

FIG. 1 is an example environment 100 in which a content distribution system 110 identifies variants of forbidden terms and prevents the distribution of content that includes the variants. The content distribution system 110 can distribute content over a data communication network 130, e.g., a local area network (LAN), a wide area network (WAN), the Internet, a mobile network, or a combination thereof. This content can include electronic documents (e.g., web pages, portable document format (pdf) documents, etc.), audio, video, images, and/or other appropriate types of content. The content distribution system 110 can also distribute content, e.g., promotional content, that is presented on or with other content.

The content distribution system 110 includes one or more front-end servers 112 that provide the content to client devices 150. For example, the front-end servers 112 can receive requests for content from the client devices and provide the content in response to the requests. The front-end servers 112 can receive content for distribution to client devices 150 from content publishers 140. The content publishers 140 can include entities, e.g., people, organizations, and/or businesses, that provide content they would like distributed to client devices 150 for presentation to users. The content can be stored in a content data storage device 124, e.g., one or more hard drives, flash memory, solid state drives, etc.

The content distribution system 110 also includes one or more variant detection servers 114 and one or more content review servers 116. The variant detection servers 114 and the content review servers 116 can be implemented as back-end servers that are in data communication, e.g., over a network, with the front-end servers 112.

The variant detection servers 114 can identify variants of forbidden terms and maintain an index 123 of forbidden terms and variants of the forbidden terms. The index 123 can be stored in a forbidden terms and variants data storage device 122, e.g., one or more hard drives, flash memory, solid state drives, etc. The index 123 can include data identifying a set of forbidden terms that the content distribution system 110 prohibits or discourages from being included in content distributed by the content distribution system 110. The index 123 can also include, for one or more of the forbidden terms, one or more variants of the forbidden term that may also be prohibited or discouraged from being included in content distributed by the content distribution system 110.

The variant detection servers 114 can identify variants of forbidden terms using one or more data sources. For example, the variant detection servers 114 can identify variants of forbidden terms using query logs 118 and/or semantic networks 120. The query logs 118 can include data identifying received queries, e.g., queries received by a search engine and from multiple client devices 150 or multiple users. The query logs 118 can also include data identifying adjustments made to received queries by the search engine. For example, the search engine may expand a query to include one or more additional terms, such as terms that are related to terms of the received query. This allows the search engine to identify documents that may be related to the received query, but that does not include the terms of the received query. In another example, the query logs 118 may include data identifying spell corrections made by the search engine to terms of received queries. For example, the search engine may detect that a term of a received query is misspelled, identify a term that the search engine considers a correct spelling of the term, and use the correct spelling of the term to identify search results for the received query. The query logs 118 can include, for each query that the search engine detected as having a misspelled term, data identifying the misspelled term of received query and the term that the search engine considered to be the correct spelling of the misspelled term.

Figure 2:
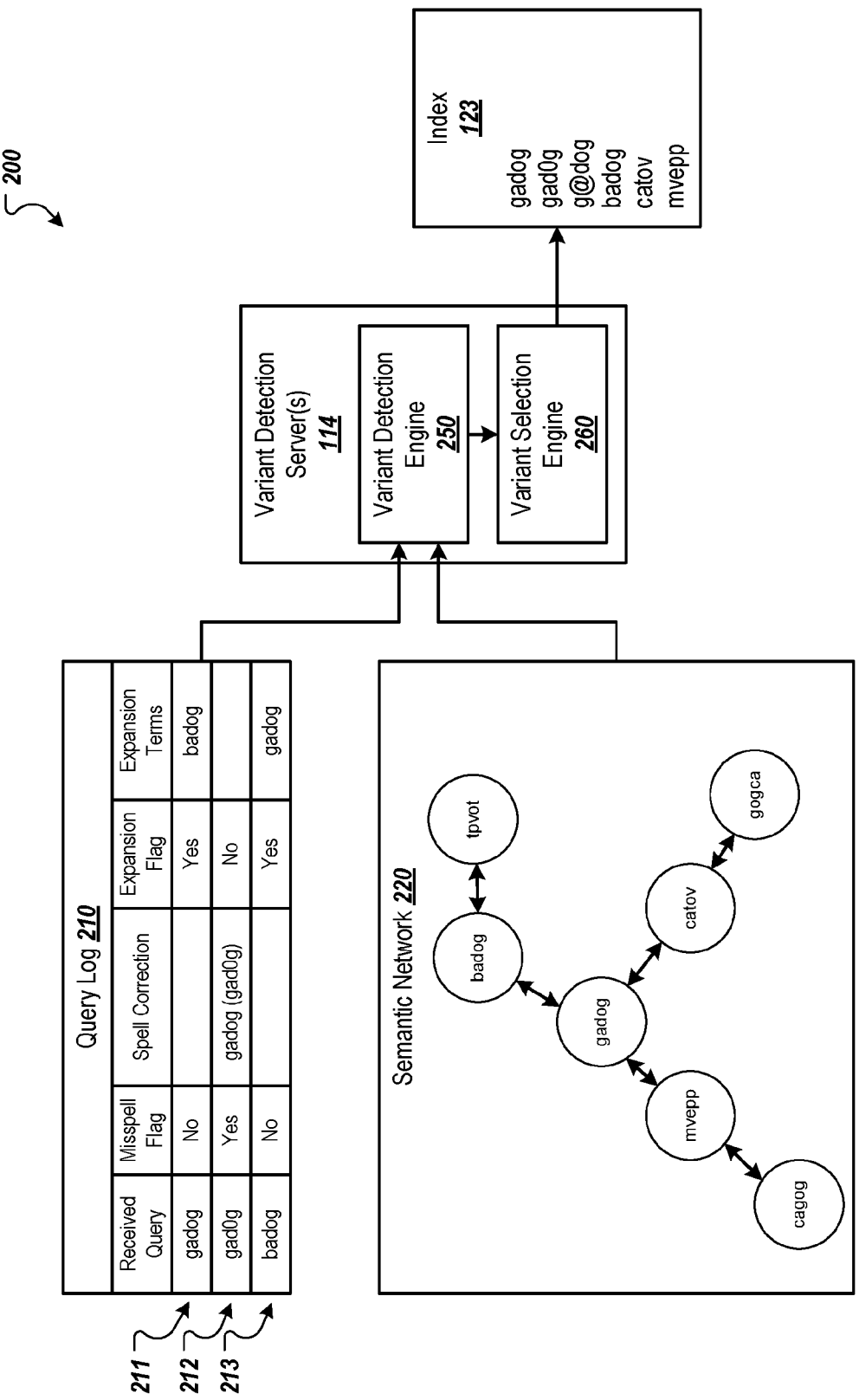
FIG. 2 is a system flow diagram of an example process for identifying variants of forbidden terms.

The variant detection servers 114 can identify, as a variant of a forbidden term, a term of a query that caused the search engine to include the forbidden term as an expansion term for the query. An expansion term is a term that is different from the term(s) submitted by a user and included in a received query, but that is used by the search engine to identify search results for the received query. The variant detection servers 114 can also identify, as a variant of a forbidden term, a term of a query that caused the search engine to correct the spelling of the term to the forbidden term. An example query log is illustrated in FIG. 2 and example techniques for using a query log to identify variants of forbidden terms is described in more detail below.

A semantic network 120 is a network of nodes and edges that represents semantic relationships between terms. For example, a semantic network 120 may include a graph of nodes, where each node represents a term. Nodes that represent terms that are related may be connected by an edge. An edge that connects two nodes represents a similarity between the terms represented by the connected nodes. For example, the edge may represent a semantic similarity between the terms. An example semantic network 120 is illustrated in FIG. 2 and example techniques for using a semantic network to identify variants of forbidden terms is described in more detail below.

The variant detection servers 114 can use the query logs 118, the semantic networks 120, and/or other data sources to identify variants of forbidden terms. For example, the variant detection server 114 may use a combination of the data sources, including the query logs 118 and the semantic networks 120, to identify variants of the forbidden terms.

Other data sources used by the variant detection servers 114 can include thesauruses, e.g., thesaurus websites and slang (or popular culture) dictionaries. For example, the variant detection servers 114 can use a thesaurus to identify, as variants of a forbidden term, one or more synonyms of the forbidden term. In another example, the variant detection servers 114 can use slang (or popular culture) dictionaries to identify, as variants of a forbidden term, slang terms used in place of the forbidden term.

As described in more detail below, the variant detection servers 114 can use the data sources to identify a set of candidate variant terms for a forbidden term. The variant detection servers 114 can then select, from the candidate variant terms, one or more variants of the forbidden term. For example, the variant detection servers 114 may rank the candidate variants based on one or more criteria and select a number of the highest ranked candidate variants (e.g., a pre-specified number) or the candidate variants that have at least a threshold score. The variant detection servers 114 can store the selected variants in the index 123. Example techniques for identifying, ranking, and selecting variants for forbidden terms are described in more detail below.

The content review servers 116 can review content to determine whether the content includes a forbidden or a variant of a forbidden term included in the index 123. For example, the content review servers 116 can review content received from content publishers 140 and/or content to determine whether the content includes a forbidden or a variant of a forbidden term included in the index 123. The content review servers 116 can prevent content that has been identified as including a forbidden term or a variant of a forbidden term from being distributed by the front-end servers 112 to client devices 150. For example, the content review servers 116 may automatically remove the content from the content data storage device 124. In another example, the content review servers 116 associate, in the index 123, a flag or other data with the content that includes a forbidden term or variant of a forbidden term. The front-end servers 112 may check the index 123 to determine whether content that the front-end servers 112 intent to distributed has been flagged as having a forbidden term or a variant of a forbidden term. If so, the front-end servers 112 may not distribute the content to client devices 150.

In yet another example, the content review servers 116 may send a notification or alert to a system administrator to notify the system administrator of content that includes a forbidden term or a variant of a forbidden term. The system administrator may then remove the content or notify the content publisher 140 that provided the content.

The content review servers 116 can review content by identifying terms in the content and comparing the identified terms to the forbidden terms and variants indexed in the index 123. For example, the content review servers 116 may use optical character recognition or other techniques to identify text included in the content. As the index 123 may only include higher ranked variants, this comparison process can be completed more quickly and by using fewer computing resources than if the index 123 included every possible, or every identified, variant of each forbidden term.

FIG. 2 is a system flow diagram 200 of an example process for identifying variants of forbidden terms. The variant detection servers 114 can obtain data from a query log 210, a semantic network 220, and/or other data sources and identify variants of forbidden terms using the obtained data.

The example query log 210 includes entries for three received queries, "gadog", "gad0g", and "badog". Assume again that the term "gadog" is the name of an illegal drug. A search engine that received the queries may create an entry in the query log for each query in response to receiving the query. For example, each row of the query log 210 can represent a single received query that was received from a particular client device. In this way, the query log 210 can include multiple rows for the same exact query. The query log 210 includes a column for received queries, a column for misspell flags that indicate whether the spelling of a term of the query was corrected, a spell correction column that specifies a spell correction used by the search engine and which term of the query was spell corrected to that term, a column for expansion flags that indicate whether the query was expanded to include one or more additional terms, and a column that specified additional terms added to the query as part of the expansion. Of course, a query log can include other columns that contain other data regarding received queries.

The first entry 211 in this example query log 210 indicates that the received query "gadog" was not spell corrected, but was expanded to include an additional term "badog". For example, the search engine may have identified the term "badog" as being a synonym or slang term for the term "gadog". The search engine may have identified the term "badog" and used the term "badog", in addition to or in place of the term "gadog", to identify search results in response to the query "gadog" even though the term "badog" was not included in the received query. Search results identified using the expansion term "badog" may be provided to the client device that submitted the query, for example, if the search results are ranked high enough to be selected by the search engine. The expansion terms cell for the first entry 211 can include each expansion term added to the received query and optionally, for each expansion term, the term that caused the search engine to add the expansion term.

The second entry 212 in the query log 210 indicates that the received query "gad0g" was spell corrected to "gadog". For example, the search engine may have detected that the term "gad0g" of the received query was likely misspelled and should have instead been "gadog". In response, the search engine may have identified search results relevant to the term "gadog" rather than, or in addition to, the term "gad0g" to provide in response to the received query "gad0g". Search results identified using the expansion term "gadog" may be provided to the client device that submitted the query, for example, if the search results are ranked high enough to be selected by the search engine. The query log 210 can include, in the spell correction column, the term "gadog" that represents what the search engine considers the correct spelling and the term "gad0g" of the received query that was corrected. In this way, the variant detection servers 114 can identify which term of the query caused the search engine to use the corrected term to identify search results for the received query.

The third entry 213 in the query log 210 indicates that the received query "badog" was not spell corrected, but was expanded to include an additional term "gadog". For example, the search engine may have identified the term "gadog" as being a synonym for the term "badog." The search engine may have identified the term "gadog" and used the term "gadog" to identify search results in response to the query "badog" even though the term "gadog" was not included in the received query. Search results identified using the expansion term "gadog" may be provided to the client device that submitted the query, for example, if the search results are ranked high enough to be selected by the search engine.

The variant detection servers 114 can include a variant detection engine 250 that identifies variants of forbidden terms based on the query log 210. For example, the variant detection engine 250 can identify, as a variant of a forbidden term, query terms for which the spelling was corrected to the forbidden term. In the example query log 210, the spelling of the term "gad0g" was corrected to "gadog." If the term "gadog" is a forbidden term, the variant detection engine 250 may classify term "gad0g" as a variant of the term "gadog" as the second entry 212 of the query log 210 indicates that the spelling of the term "gad0g" was corrected to the forbidden term "gadog". To identify variants of a forbidden term based on spell corrections, the variant detection engine 250 can evaluate the query log 210 to identify entries in which the misspell flag (e.g., a data flag specifying whether a term was identified as a misspelled term) is "yes" and/or the spell correction includes the forbidden term. For each such entry, the variant detection engine 250 can identify the term of the received query that was corrected to the forbidden term and classify that term as a variant of the forbidden term.

The variant detection engine 250 can also identify, as a variant of a forbidden term, received queries that were expanded to include the forbidden term. For example, if the term "gadog" is a forbidden term, the variant detection engine 250 may identify the term "badog" as a variant using the third entry 213 as the third entry 213 indicates that the query "badog" was expanded to include the forbidden term "gadog". To identify variants of a forbidden term based on expansion terms, the variant detection engine 250 can evaluate the query log 210 to identify entries in which the expansion flag is "yes" and/or the expansion terms include the forbidden term. For each such entry, the variant detection engine 250 can identify the term of the received query that caused the search engine to identify the forbidden term as an expansion term and classify that term as a variant of the forbidden term.

Similarly, the variant detection engine 250 can identify, as a variant of a forbidden term, expansion terms added to a received query that includes the forbidden term. For example, if the term "gadog" is a forbidden term, the variant detection engine 250 may identify the term "badog" as a variant of the forbidden term "gadog" using the first entry 211 as the first entry 211 specifies a received query that includes the forbidden term "gadog" and this query was expanded to include the term "badog". To identify variants of a forbidden term based on expansion terms, the variant detection engine 250 can evaluate the query log 210 to identify entries in which the expansion flag is "yes" and/or the received query includes the forbidden term. For each such entry, the variant detection engine 250 can identify expansion terms added to the received query based on the query including the forbidden term and classify the expansion terms as variants of the forbidden term.

Using the query log to identify variants of forbidden terms allows the variant detection servers 114 to identify terms that are more commonly used by users and/or more likely to be used by users to avoid detection by a content review system. The use of the query logs also allows the variant detection servers 114 to identify terms that are natural variations of the forbidden terms.

The variant detection engine 250 can also identify variants of forbidden terms using the semantic network 220. The semantic network 220 is a graph of nodes that represent terms and edges between semantically related terms. For example, the node for "gadog" is connected to the nodes for "badog", "catov", and "mvepp" using edges. This indicates that the term "gadog" is semantically related (e.g., semantically similar) to the terms "badog", "catov", and "mvepp". Similarly, the node for "badog" is connected to the node for "tpvot", indicating that the term "badog" is semantically related to the term "tpvot".

The variant detection engine 250 can identify the node for a forbidden term, e.g., "gadog", in the semantic network 220. The variant detection engine 250 can then classify, as variants of the forbidden term, the terms of the nodes connected to the node for the forbidden term. For the term "gadog", the variant detection engine 250 would classify the terms "badog", "catov", and "mvepp" as variants as the nodes for these terms are connected to the node for "gadog".

In some implementations, the variant detection engine 250 classifies, as variants of a forbidden term, only those terms whose node is directly connected to the node for the forbidden term in the semantic network 220. Thus, a term represented by a node that is connected to another node that is directly connected to the node for the forbidden term would not be classified as a variant of the forbidden term. For example, the term "cagog" would not be classified as a variant of "gadog" in this example implementation. In some implementations, the variant detection engine 250 may classify terms that within a specified number of nodes of the forbidden term as variants of the forbidden term. For example, if the specified number is two or more, the term "cagog" would be classified as a variant of the term "gadog".

The variant detection engine 250 can provide data specifying forbidden terms and the identified variants for each forbidden term to a variant selection engine 260. The variant selection engine 260 can select, for each forbidden term, one or more of the variants for inclusion in the index 123. For example, the variants identified by the variant detection engine 250 may be candidate variants from which the variant selection engine 260 selects the variants.

In some implementations, the variant selection engine 260 ranks the variants for a forbidden term and selects one or more of the higher ranked variants. The variant selection engine 260 may rank the variants based on one or more criteria. For example, the variant selection engine 260 may rank variants identified using spell corrections of the query logs using edit distance scores for the variants. The edit distance score for a variant of a forbidden term is a measure of dissimilarity between the string of characters of the variant and the string of characters of the forbidden term. For example, the edit distance score for a variant may be based on the number of character changes to change the variant to the forbidden term. Variants having a greater dissimilarity may have a greater edit distance score. The variant selection engine 260 may rank variants identified using query expansions of the query logs, using the semantic network, thesauruses, and/or slang dictionaries based on inverse document frequency score of the variants as edit distance may not be as useful for synonyms that are very different in spelling from the forbidden terms. In this way, more frequently occurring variants can be ranked higher than less frequently occurring variants.

The variant selection engine 260 can generate, for a forbidden term, a first ranking for variants ranked based on edit distance scores and a second ranking for variants ranked based on inverse document frequency. The variant selection engine 260 can then select from one or both rankings one or more of the variants. For example, the variant selection engine 260 may select the top N variants from each ranking, where N is a pre-specified number. In another example, the variant selection engine 260 may select, from each ranking, each variant that has at least a threshold score for that ranking. The variant selection engine 260 can store the selected variants in the index 123.

The variant detection servers 114 can identify, rank, and/or select variants automatically, for example, on a periodic basis. For example, the variant detection servers 114 may process query logs and/or semantic networks daily, weekly, or monthly to identify, rank, and/or select variants of forbidden terms. In this way, the variant detection servers 114 can learn variants of forbidden terms over time. This allows the variant detection servers 114 to identify new variants or variants that are becoming more popular due to more frequent use of certain variants.

In some implementations, the variant detection servers 114 determine the period for identifying variants of a particular forbidden term based on whether new variants are being identified and/or the number of new variants being identified for the forbidden term. For example, the variant detection servers 114 may extend the period to reduce the frequency at which the variant detection servers 114 attempt to identify variants of a particular forbidden term if the variant detection servers 114 have not identified at least a threshold number of variants of the particular forbidden term in previous attempts to identify variants of the particular forbidden term. This reduces the consumption of computing resources used to identify variants of forbidden terms, allowing the computing resources to be used for other purposes.

Figure 3:
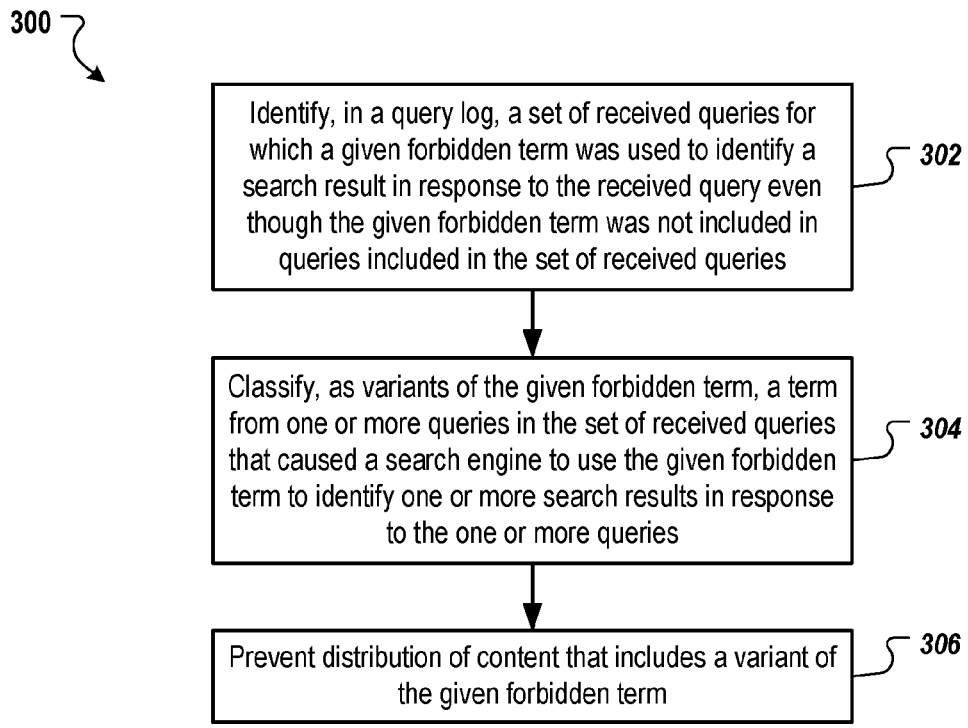
FIG. 3 is a flowchart of an example process for identifying variants of forbidden terms and preventing the distribution of content that includes the variants.

FIG. 3 is a flowchart of an example process 300 for identifying variants of forbidden terms and preventing the distribution of content that includes the variants. Operations of the process 300 can be implemented, for example, by a system that includes one or more data processing apparatus, such as the content distribution system 110 of FIG. 1. The process 300 can also be implemented by instructions stored on a computer storage medium, where execution of the instructions by a system that includes a data processing apparatus cause the data processing apparatus to perform the operations of the process 300.

The system identifies, in a query log, a set of received queries for which a given forbidden term was used to identify a search result in response to the received query even though the given forbidden term was not included in queries included in the set of received queries (302). For example, the system may identify, for the given forbidden term, one or more entries in the query log for which a query was expanded to include the given forbidden term even though the given forbidden term was not included in the query. In another example, the system may identify, for the given forbidden term, one or more entries in the query log for which the spelling of a term of a query was corrected to the given forbidden term. The set of received queries can include each query that was expanded to include the forbidden term and/or each query for which a term of the query was spell corrected to the forbidden term.

The system classifies, as variants of the forbidden term, a term from one or more queries in the set of received queries that caused a search engine to use the given forbidden term to identify one or more search results in response to the one or more queries (304). For example, the system may classify, as a variant of the given forbidden term, a term of a query that caused the search engine to expand the query to include the forbidden term. In a particular example, the search engine may identify a forbidden term "gadog" as a synonym of a term "badog" included in a received query and expand the query to include the term "gadog". In this example, the system may classify the term "badog" as a variant of the forbidden term "gadog". The query log may include data specifying, for each expansion term, which term of the received query caused the search engine to expand the query to include the expansion term.

In another example, the system may classify, as a variant of the given forbidden term, a term of the query for which the search engine corrected the spelling to the forbidden term. In a particular example, the search engine may correct the spelling of the term "gad0g" to the forbidden term "gadog". In this example, the system may classify the term "gad0g" as a variant of the forbidden term "gadog". The query log may include data specifying which term of the query was spell corrected to the spell corrected term.

As described above, the system may also classify, as variants of the given forbidden term, terms that are semantically related to the given forbidden term. For example, the system may access a semantic network and classify, as variants of the given forbidden term, one or more terms that are directly linked to the given forbidden term. The system may also identify variants of the given forbidden term using thesauruses, slang dictionaries, and/or other appropriate data sources.

The system prevents distribution of content that includes a variant of the given forbidden term (306). For example, the system may identify content that includes the given forbidden term or a variant of the given forbidden term. The system can automatically block distribution of the identified content, e.g., by removing the content from a set of available content. In another example, the system may forward the content to a system administrator for review of the content. The system administrator may then block the content, e.g., by removing the content from a set of available content, if the variant is being used for a prohibited purpose.

Figure 4:
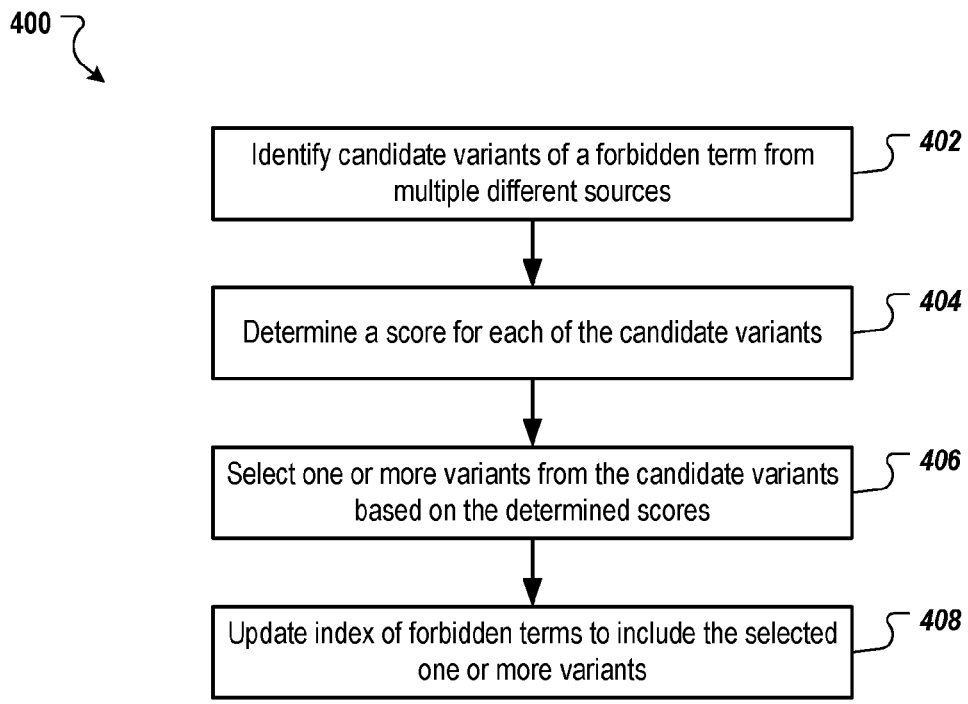
FIG. 4 is a flowchart of an example process for selecting variants of a forbidden term from a set of candidate variants.

FIG. 4 is a flowchart of an example process 400 for selecting variants of a forbidden term from a set of candidate variants. Operations of the process 400 can be implemented, for example, by a system that includes one or more data processing apparatus, such as the content distribution system 110 of FIG. 1. The process 400 can also be implemented by instructions stored on a computer storage medium, where execution of the instructions by a system that includes a data processing apparatus cause the data processing apparatus to perform the operations of the process 400.

The system identifies candidate variants of a forbidden term from multiple different sources (402). For example, the system may identify a first set of candidate variants from a query log. These candidate variants may include terms of queries for which a search engine expanded the queries to include the forbidden term and/or terms of queries for which the search engine corrected the spelling to the forbidden term. The system may also identify a second set of variants using a semantic network. For example, these candidate variants may include terms that are directly linked to the forbidden term in the semantic network. The system may identify additional sets of variants from other data sources, e.g., thesauruses, slang dictionaries, etc.

The system determines a score for each of the candidate variants (404). The scores for the variants can be based on different criteria, for example, based on the type of candidate variant or the data source from which the candidate variant was identified. For example, the score for a candidate variant that was identified based on the spelling of the variant being corrected to the forbidden term may be based on an edit distance between the candidate variant and the forbidden term. The score for a candidate variant that is related to the forbidden term may be based on inverse document frequency. For example, the score for candidate variants that are identified from semantic networks and/or the score for variants identified from query expansions in query logs may be based on inverse document frequency. The scores for synonyms and slang candidate variants identified from thesauruses and slang dictionaries can also be based on inverse document frequency.

Scores for candidate variants identified from query logs may be based on the frequency at which the variant appears in the query log. For example, a popular candidate variant that occurs frequently in the query log may have a higher score than a less popular variant that occurs less frequently in the query logs. The score for such candidate variants may be based on the number of occurrences of the candidate variant in queries that were spell corrected or expanded to include the forbidden term. For example, a candidate variant that was corrected to the forbidden term more times that another candidate variant may have a higher score than the other candidate variant. The score for a candidate variant identified from query logs may be based on a combination of the edit distance or inverse document frequency and the number of occurrences of the candidate variant in the query log or the number of occurrence of the variant in entries for which a received query was spell corrected or expanded to include the forbidden term.

The system selects one or more variants from the candidate variants based on the determined scores (406). In some implementations, the system generates a ranking of candidate variants for each score types. For example, the system may generate a first ranking of candidate variants scored based on edit distance (or edit distance combined with frequency of occurrence in the query logs). The system may also generate a second ranking of candidate variants scored based on inverse document frequency (or inverse document frequency combined with frequency of occurrence in the query logs).

The system may select, as variants of the forbidden term, one or more candidate variants from one or more of the rankings. For example, the system may select variants from both rankings. The system may select the top N variants from each ranking and/or variants in each ranking that has at least a threshold score, where N is a pre-specified number.

The system updates an index of forbidden terms to include the selected one or more variants (408). The index may include forbidden terms and selected variants of the forbidden terms. The system may update the index to include the selected variants that are not already included in the index.

Figure 5:
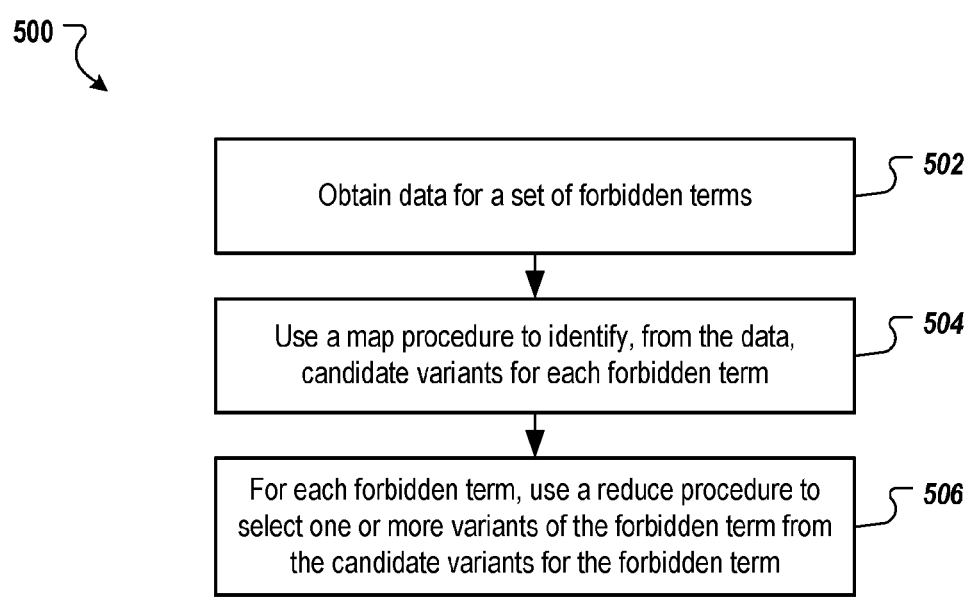
FIG. 5 is a flowchart of an example process for identifying variants of forbidden terms using MapReduce techniques.

FIG. 5 is a flowchart of an example process 500 for identifying variants of forbidden terms using MapReduce techniques. Operations of the process 500 can be implemented, for example, by a system that includes one or more data processing apparatus, such as the content distribution system 110 of FIG. 1. The process 500 can also be implemented by instructions stored on a computer storage medium, where execution of the instructions by a system that includes a data processing apparatus cause the data processing apparatus to perform the operations of the process 500.

The system obtains data for a set of forbidden terms (502). For example, the system may obtain an index or list of forbidden terms. The system may also obtain, e.g., from one or more search systems, query logs that include data specifying queries, query expansions, and/or query spell corrections. The system may also obtain data specifying semantic relationships between terms, e.g., data specifying semantic networks.

The system uses a map procedure to identify, from the data, candidate variants for each forbidden term (504). The map procedure may be performed by a cluster of computers. Each computer of the cluster can process a portion of the data, e.g., in parallel, to sort the data based on forbidden terms. For example, each computer may process a portion of the data to identify each forbidden term included in the data and, for each forbidden term, candidate variants of the forbidden term. In this way, the data can be sorted based on forbidden term more quickly and more efficiently than using serial processing of the data by one computer.

In some implementations, the system may assign each computer in the cluster a portion of the data. For example, the system may assign a portion of the query log(s) to each of one or more of the computers. The system may also assign a portion of the semantic network(s), thesauruses, slang dictionaries, etc. to each of one or more of the computers. Each computer may process its portion of the data and output the forbidden terms found in the data and, for each forbidden term, any candidate variants of the forbidden term found in the data. The computers can identify the candidate variants by processing the query logs, semantic networks, thesauruses, slang dictionaries, as described above.

One or more of the computers can receive the data output by the computers and group the output data based on forbidden term. For example, multiple computers may find the same forbidden terms in their respective portions of the data. The one or more computers can generate, for each identified forbidden term, a group that includes the data output by the computers from the map procedure.

The system uses a reduce procedure to select, for each forbidden term, one or more variants of the forbidden term from the candidate variants for the forbidden term (506). In some implementations, the system uses a separate computer for each forbidden term. For example, a cluster of computers may perform the reduce procedure, where each computer processes the data for a subset of the forbidden terms. The subset of forbidden terms for which data is processed by each computer may include fewer than all of the forbidden terms, e.g., one of the forbidden terms. The cluster of computers can process the data for the forbidden terms in parallel, resulting in quicker and more efficient processing of the data than if a single computer processed the data for each forbidden term in series.

Each computer can select, from the candidate variants of its forbidden term, one or more variants to add to an index of forbidden terms and their variants. For example, each computer can score and rank the candidate forbidden terms and select, based on the scores and/or rank, one or more of the candidates as variants of the forbidden term. The computers can select variants using the example process 400 illustrated in FIG. 4 and described above.

Each computer can output the selected variants of its respective forbidden term. The system can receive the output and update the index to include any new variants selected by the computers.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system, comprising:
    one or more data storage devices that store (i) data identifying a set of forbidden terms and (ii) a query log that includes received queries;
    one or more front-end servers that receive content for distribution over a data communication network; and
    one or more back-end servers that communicate with the data storage device and the one or more front-end servers and performs operations including:
        identifying, in the query log, a set of received queries for which a given forbidden term was used to identify a search result that was provided in response to the received query even though the given forbidden term was not included in the received query;
        generating a set of candidate variants of the given forbidden term based on the set of received queries identified in the query log, the generating comprising:
            for each query in the set of received queries;
                determining, based on data of the query log, that one or more terms in the query caused, when processed by a search engine in response to receiving the query, the search engine to use the forbidden term to identify one or more search results provided in response to the query, and
                classifying each of the one or more terms as a candidate variant of the given forbidden term in response to determining that the one or more terms caused the search engine to use the given forbidden term to identify the one or more search results provided in response to the query;

determining a score for each candidate variant of the given forbidden term based on a frequency at which the candidate variant of the forbidden term occurs in the query log;

selecting, from a ranking of the candidate variants of the given forbidden term, a set of forbidden variants of the given forbidden term, wherein the ranking of the candidate terms is based on the score for each candidate variant of the forbidden term; and preventing distribution of content that depicts a term included in the set of forbidden variants of the given forbidden term by the one or more front-end servers in response to the term being classified as a variant of the given forbidden term and included in the set of forbidden variants of the given forbidden term.

2. The system of claim 1, wherein identifying the set of received queries for which the given forbidden term was used to identify the search result in response to the received query even though the given forbidden term was not included in queries included in the set of received queries comprises identifying a given received query that was expanded by the search engine to include the given forbidden term.

3. The system of claim 1, wherein the one or more back-end servers perform operations comprising identifying, using a semantic network of terms, a term semantically linked to the given forbidden term as a candidate variant of the given forbidden term.

4. The system of claim 1, wherein selecting, from the ranking of the candidate variants of the given forbidden term, the set of forbidden variants of the given forbidden term comprises:

generating the ranking of the candidate variants by ordering the candidate variants based on the score for each candidate variant; and selecting, as the forbidden variants of the forbidden term, one or more of the candidate variants from the ranking of the candidate variants based on the score for each candidate variant.

5. The system of claim 4, wherein:

the set of candidate variants includes a first candidate variant for which a spelling of the first candidate variant was corrected to the candidate forbidden term and a second candidate variant that was added to a received query that included the given forbidden term;

the score for the first candidate variant is further based on an edit distance between the first candidate variant and the given forbidden term; and the score for the second candidate variant is further based on inverse document frequency score for the second candidate variant.

6. The system of claim 1, wherein identifying, in the query log, the set of received queries for which the given forbidden term was used to identify the search result that was provided in response to the received query even though the given forbidden term was not included in the received query comprises using a map procedure to identify, from the query log, candidate variants of each forbidden term.

7. The system of claim 6, wherein selecting, from the ranking of the candidate variants of the given forbidden term, the set of forbidden variants of the given forbidden term comprises using a reduce procedure for the given forbidden term to select, from the candidate variants for the given forbidden term, one or more forbidden variants of the forbidden term, wherein each reduce procedure is performed on a separate back-end server.

8. The system of claim 1, wherein selecting, from the ranking of the candidate variants of the given forbidden term, the set of forbidden variants of the given forbidden term comprises:

for each candidate variant, identifying an additional score for the candidate variant that is based on a number of occurrences, in the query log, of the candidate variant in queries that were spell corrected or expanded to include the candidate variant; and selecting, as the forbidden variants of the forbidden term, one or more candidate variants based further on the additional score for each candidate variant.

9. The system of claim 1, wherein:

the score for each candidate variant is based on a data source from which the candidate variant was identified;

each data source has respective criteria for which the score for candidate variants identified from the data source is determined; and the criteria for at least one data source is different from the criteria for one or more other data sources.

10. A method for preventing distribution of forbidden content, comprising:

receiving, by one or more servers, content for distribution over a data communication network;

identifying, in a query log that includes received queries, a set of received queries for which a given forbidden term was used to identify a search result that was provided in response to the received query even though the given forbidden term was not included in the received query;

generating a set of candidate variants of the given forbidden term based on the set of received queries identified in the query log, the generating comprising:

for each query in the set of received queries:

determining, based on data of the query log, that one or more terms in the query caused, when processed by a search engine in response to receiving the query, the search engine to use the forbidden term to identify one or more search results provided in response to the query; and classifying each of the one or more terms as a candidate variant of the given forbidden term in response to determining that the one or more terms that caused the search engine to use the given forbidden term to identify the one or more search results provided in response to the query, determining a score for each candidate variant of the given forbidden term based on a frequency at which the candidate variant of the forbidden term occurs in the query log;

selecting, from a ranking of the candidate variants of the given forbidden term, a set of forbidden variants of the given forbidden term, wherein the ranking of the candidate terms is based on the score for each candidate variant of the forbidden term; and preventing, by the one or more servers, distribution of content that depicts a term included in the set of forbidden variants of the given forbidden term in response to the term being classified as a variant of the given forbidden term and included in the set of forbidden variants of the given forbidden term.

11. The method of claim 10, wherein identifying the set of received queries for which the given forbidden term was used to identify the search result in response to the received query even though the given forbidden term was not included in queries included in the set of received queries comprises identifying a given received query that was expanded by the search engine to include the given forbidden term.

12. The method of claim 10, further comprising identifying, using a semantic network of terms, a term semantically linked to the given forbidden term as a candidate variant of the given forbidden term.

13. The method of claim 10, wherein selecting, from the ranking of the candidate variants of the given forbidden term, the set of forbidden variants of the given forbidden term comprises:
generating the ranking of the candidate variants by ordering the candidate variants based on the score for each candidate variant; and
selecting, as the forbidden variants of the forbidden term, one or more of the candidate variants from the ranking of the candidate variants based on the score for each candidate variant.

14. The method of claim 13, wherein:
the set of candidate variants includes a first candidate variant for which a spelling of the first candidate variant was corrected to the candidate forbidden term and a second candidate variant that was added to a received query that included the given forbidden term;
the score for the first candidate variant is further based on an edit distance between the first candidate variant and the given forbidden term; and
the score for the second candidate variant is further based on inverse document frequency score for the second candidate variant.

15. The method of claim 10, wherein identifying, in the query log, the set of received queries for which the given forbidden term was used to identify the search result that was provided in response to the received query even though the given forbidden term was not included in the received query comprises using a map procedure to identify, from the query log, candidate variants of each forbidden term.

16. The method of claim 15, wherein selecting, from the ranking of the candidate variants of the given forbidden term, the set of forbidden variants of the given forbidden term comprises using a reduce procedure for the given forbidden term to select, from the candidate variants for the given forbidden term, one or more forbidden variants of the forbidden term, wherein each reduce procedure is performed on a separate back-end server.

17. A non-transitory computer storage medium encoded with a computer program, the program comprising instructions that when executed by one or more data processing apparatus cause the data processing apparatus to perform operations comprising:
receiving, by one or more servers, content for distribution over a data communication network;
identifying, in a query log that includes received queries, a set of received queries for which a given forbidden term was used to identify a search result that was provided in response to the received query even though the given forbidden term was not included in the received query;
generating a set of candidate variants of the given forbidden term based on the set of received queries identified in the query log, the identifying comprising:
for each query in the set of received queries:
determining, based on data of the query log, that one or more terms in the query caused, when processed by a search engine in response to receiving the query, the search engine to use the forbidden term to identify one or more search results provided in response to the query; and
classifying each of the one or more terms as a candidate variant of the given forbidden term in response to determining that the one or more terms that caused the search engine to use the given forbidden term to identify the one or more search results provided in response to the query,
determining a score for each candidate variant of the given forbidden term based on a frequency at which the candidate variant of the forbidden term occurs in the query log;
selecting, from a ranking of the candidate variants of the given forbidden term, a set of forbidden variants of the given forbidden term, wherein the ranking of the candidate terms is based on the score for each candidate variant of the forbidden term; and
preventing, by the one or more servers, distribution of content that depicts a term included in the set of forbidden variants of the given forbidden term in response to the term being classified as a variant of the given forbidden term and included in the set of forbidden variants of the given forbidden term.

18. The non-transitory computer storage medium of claim 17, wherein identifying the set of received queries for which the given forbidden term was used to identify the search result in response to the received query even though the given forbidden term was not included in queries included in the set of received queries comprises identifying a given received query that was expanded by the search engine to include the given forbidden term.

19. The non-transitory computer storage medium of claim 17, wherein selecting, from the ranking of the candidate variants of the given forbidden term, the set of forbidden variants of the given forbidden term comprises:
generating the ranking of the candidate variants by ordering the candidate variants based on the score for each candidate variant; and
selecting, as the forbidden variants of the forbidden term, one or more of the candidate variants from the ranking of the candidate variants based on the score for each candidate variant.

20. The non-transitory computer storage medium of claim 19, wherein:
the set of candidate variants includes a first candidate variant for which a spelling of the first candidate variant was corrected to the candidate forbidden term and a second candidate variant that was added to a received query that included the given forbidden term;
the score for the first candidate variant is further based on an edit distance between the first candidate variant and the given forbidden term; and
the score for the second candidate variant is further based on inverse document frequency score for the second candidate variant.

* * * * *